April 22, 1969  J. B. DIXON  3,439,937
ARTICULATED VEHICLES
Filed Sept. 28, 1966  Sheet 1 of 3

Inventor
John Bell Dixon
By Cushman, Darby & Cushman
Attorneys 3,439,937
ARTICULATED VEHICLES
John Bell Dixon, Woking, England, assignor to The Secretary of State for Defence in Her Britannic Majesty's Government of the United Kingdom of Great Britain and Northern Ireland, London, England
Filed Sept. 28, 1966, Ser. No. 583,493
Claims priority, application Great Britain, Sept. 30, 1965, 41,634/65
Int. Cl. B60d 1/02
U.S. Cl. 280—446                    8 Claims

ABSTRACT OF THE DISCLOSURE

An articulated vehicle is provided with a convex form at an end of one of its adjacent articulated sections, and rollers are placed in bearing contact between the convex end and the next adjacent section so that stresses on a pivotal connection between the two sections are relieved. The convex end portion may have a curvature of changing radius so that adjacent sections of the vehicle are self-centering relative to each other.

---

The invention relates to articulated vehicles. Such vehicles may be formed in two parts, a front and a rear part, connected together by a simple pin joint, the two parts being articulated by hydraulic rams in order that the vehicle may be steered. With such a vehicle the loads imposed upon the pin joint are considerable and therefore the joint must be made large thereby restricting the space available in a vehicle. It is an object of the invention to couple together two parts of an articulated vehicle with an improved joint which allows improved space utilisation in the vehicle.

According to this invention two parts of a vehicle are articulated together, one part having a convex portion which is received in a suitably shaped concave portion in the other part.

Figure 1:
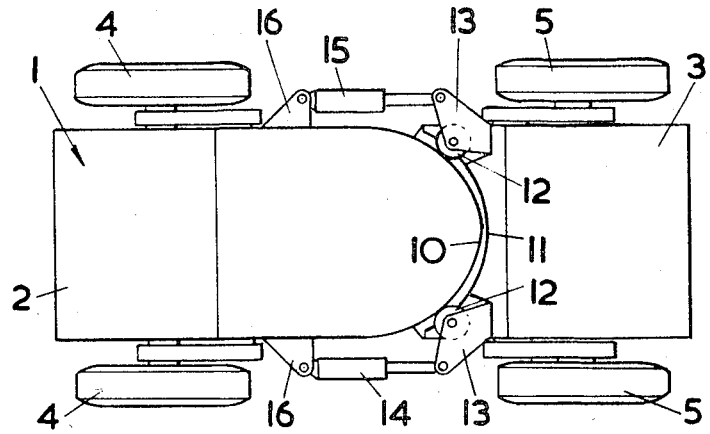
Figure 2:
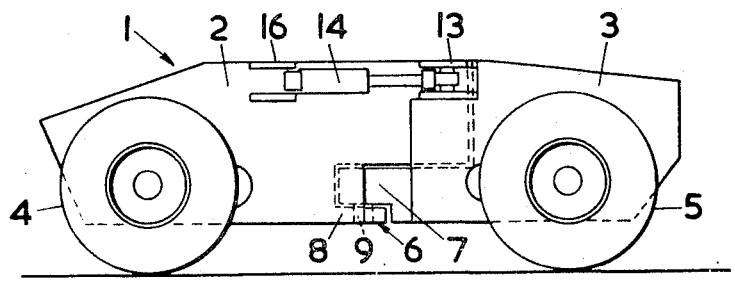
Figure 3:
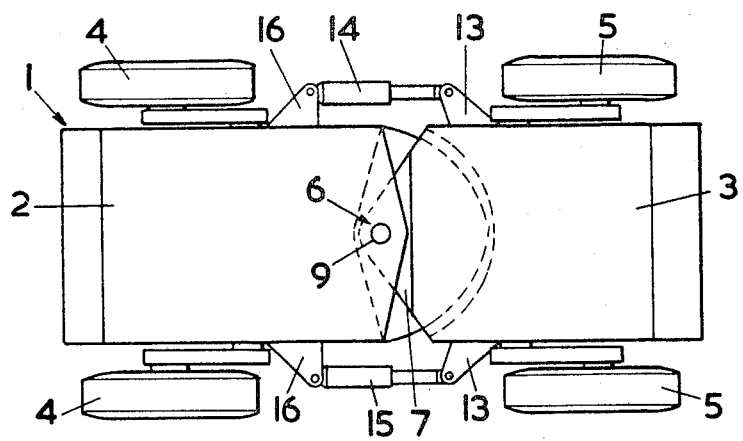
Figure 4:
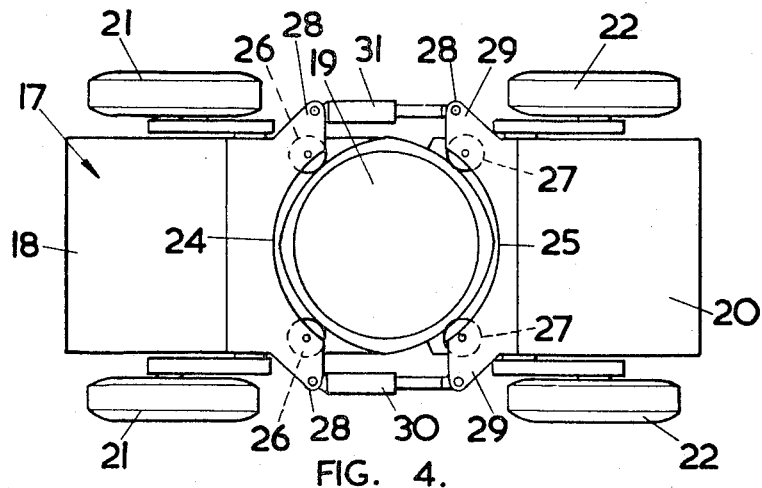
Figure 5:
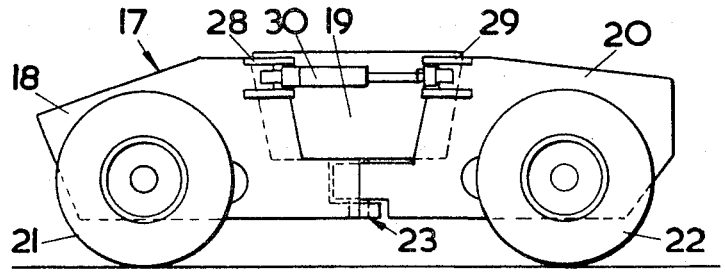
Figure 6:
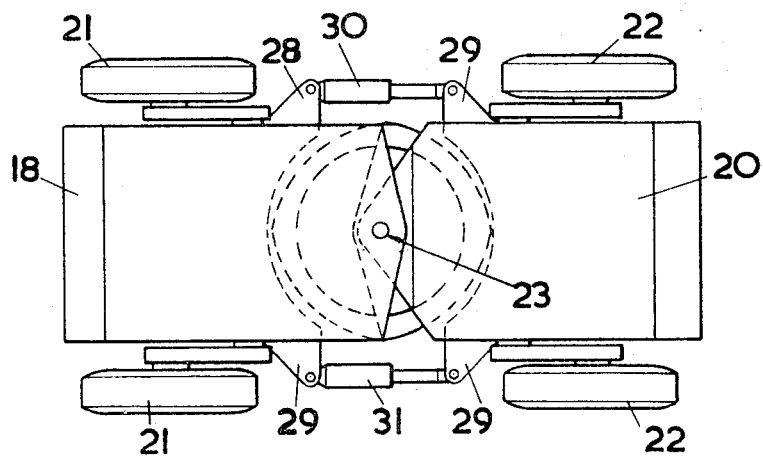
Figure 7:
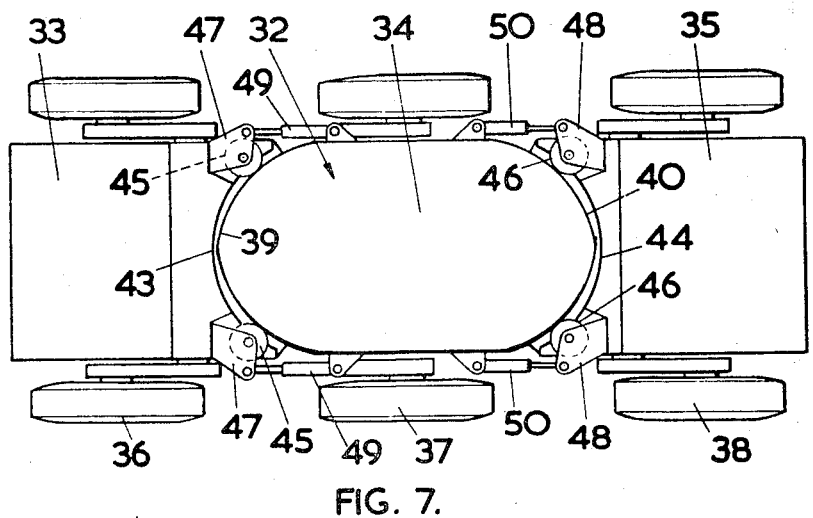
Figure 8:
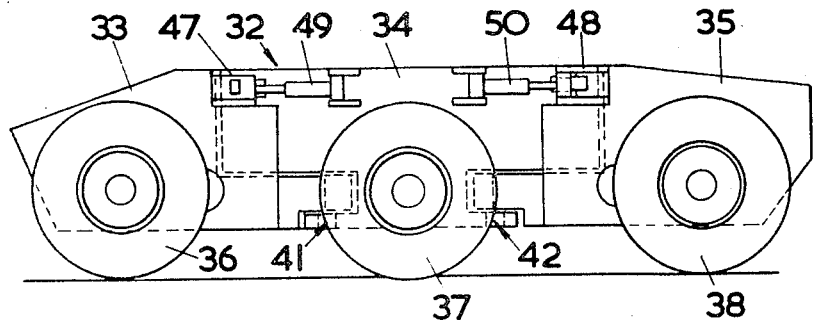

The invention will now be described by way of example only in the accompanying drawings in which:

FIGURES 1, 2, 3 are plan, side, and inverted plan views respectively of one form of the invention, FIGURES 4, 5, 6 are plan, side, and inverted plan views respectively of an alternative form of the invention, and FIGURES 7, 8 are plan and side views respectively of a further form of the invention.

As shown in FIGURES 1, 2, 3 one form of the invention comprises a four wheeled articulated vehicle 1 formed in two parts, a front part 2 and a rear part 3, both parts 2, 3 being mounted on a pair of wheels 4, 5 and connected together at a point near their under sides by a pin or ball joint 6. This pin or ball joint 6 consists of a flange 7, located at the front of the rear part 3, which overlaps a similar flange 8 at the rear of the front part 2 and is connected thereto by a suitable pin or ball 9. Above the pin joint 6 the rear end 10 of the front part 2 is of convex part cylindrical form and is received in a matching concave front end 11 of the rear part 3. Contact between the convex end 10 and the concave end 11 is prevented by rollers 12 carried in brackets 13 fixed to the rear part 3 engaging upon the convex end 10 of the front part 2. Hydraulic rams 14, 15 are arranged on both sides of the vehicles 1 one end of each ram 14, 15 being attached to brackets 16 on the front part 2 of the vehicle 1 and the other end attached to the brackets 13 on the rear part 3. These rams 14, 15 are constantly loaded to maintain contact between the rollers 12 and the convex end 10 of the front part 2.

In order to provide a self-centering or self-aligning effect the part of the convex end 10 which the rollers 12 contact is profiled so that the points of contact between the rollers and the profiled end are at minimum radius when the two parts of the vehicle are aligned for straight running and increase to maximum radius as the vehicle 1 articulates to its maximum articulation. Thus the centre of the vehicle 1 will rise as the two parts 2, 3 articulate and will lower as the two parts 2, 3 are brought into alignment. As a result of this vertical movement the weight of the vehicle 1 will tend to align the vehicle 1 for straight running.

An alternative form of the invention shown in FIGURES 4, 5, 6 comprises a four wheeled vehicle 17 formed in three parts, a front part 18, a centre part 19 and a rear part 20. The front and rear parts 18, 20 are each mounted on a pair of wheels 21, 22 and are connected together adjacent their lower surface by a pin or ball joint 23. Above the pin joint 23 the facing end 24, 25 of the front and rear parts 18, 20 are concave and shaped to receive the centre part 19, which may be of cylindrical form but is preferably of truncated conical form, with its major diameter uppermost. This centre part 19 may be connected to the pin joint 23 and be rotatable relative to both the front and rear part. Rollers 26, 27 carried in brackets 28, 29 on the front and rear part 18, 20 engage the centre part 19 near its end of major diameter to prevent contact between the centre part 19 and the concave ends 24, 25 of the front and rear parts 18, 20. Hydraulic rams 30, 31 on both sides of the vehicle 17 are connected to the front and the rear parts 18, 20 both to pre-load the rollers 24, 27 onto the centre part 19 and to articulate the vehicle 17 in order to steer it. Rotating means, such as gearing (not shown), may be provided to rotate the centre part 19 relative to the front or rear parts 18, 20. In order to provide a self-centring effect the portion of the centre part 19 which the rollers 26, 27 contact is changed from being circular in plan to a four lobed form having its minimum radii positions in contact with the rollers 26, 27 when the vehicle 17 is aligned for straight running. This four lobed form lifts the centre of the vehicle 19 when it articulates. The weight of the centre 19 part will therefore tend to align the vehicle 17 for straight running.

A further form of the invention is shown in FIGURES 7, 8 and comprises a six wheeled vehicle 32 formed in three parts namely a front part 33, a centre part 34, and a rear part 35, each part being mounted upon a pair of wheels 36, 37, 38. The centre part 34, which may be of cylindrical form but is preferably of elongated form with shaped ends 39, 40, is connected at its ends and adjacent its underside by pin or ball joints 41, 42 as before. Above the pin joints 41, 42 the ends 39, 40 of the centre part 34 are of convex part cylindrical form and are received in concave shaped ends 43, 44 of the front and rear parts 33, 34 respectively. Rollers 45, 46 carried in brackets 47, 48 on the front and rear parts 33, 35 contact the convex ends 39, 40 of the centre part 34. Hydraulic rams 49, 50 on both sides of the vehicle are connected to the front and centre part 33, 34, and to the centre and rear part 34, 25 respectively. These hydraulic rams 49, 50 both pre-load the rollers 45, 46 against the convex ends 39, 40 of the centre part 34 and articulate the vehicle 32 to steer it. If desired the axes of the pin joints 41, 42 and convex ends 39, 40 of the centre part 34 may be inclined upwardly towards the centre of the vehicle 32 to obtain a self-centring effect when the vehicle 32 is on flat ground, but preferably the self-centring effect is provided by profiling the convex ends 39, 40 of the centre part in a manner similar to that shown in FIGURES 1, 2, 3 in the first embodiment of the invention.

In order to provide a stable steering of the above vehicle 32 the articulation of the three parts 33, 34, 35 may be applied in sequence, i.e. the front part 32 may be articulated whilst the centre and rear parts 34, 25 are kept in alignment until a set degree of articulation of the front part 33 is effected after which the rear part 35 may also be articulated.

An alternative method of obtaining a self-centring effect on any of the described forms of the invention is to use eccentrically mounted rollers in conjunction with a circular track and to connect the rollers and track together, e.g. by gearing, so that they rotate in a fixed relation. Such rollers would be of sufficient diameter so as to rotate not more than one revolution when the vehicle articulates from full left to full right lock.

A further method of obtaining a self-centring effect is to use self-centering springs which will spring urge the parts of the vehicle into alignment.

It should be understood that although the invention has been described for use with wheeled vehicles it may also be applied to multitracked vehicles.

In each of the previously described forms of the invention hydraulic rams have been used to articulate the vehicle. Alternative means for articulating the vehicle are screw and nut gearing, wire ropes, and toothed gearing but in this latter arrangement there would be no pre-loading of the rollers on the convex ends. If desired the rollers may be replaced by friction pads.

I claim:
1. An articulated vehicle comprising:
at least two sections articulated together,
at least one pivot means connecting two adjacent sections near their lower sides for relative movement about a vertical axis, said vertical axis being horizontally offset from an intersection with any wheel-supporting axle of said vehicle,
a substantially upright body portion formed at an end of one of said adjacent sections, said body portion having a convex shape near an upper level and at an end of said one adjacent section, with the convex shape of said body portion being generally centered about an axis which is coaxial with said pivot means,
a plurality of vertical axle means fixed relative to the second of said two adjacent sections, said plurality of axle means being juxtaposed relative to said convex end portion, and a roller means carried on each axle means for contacting the convex end portion, and
means for maintaining said rollers in continuous bearing contact with said convex end portion, whereby said rollers and said convex body portion coact jointly with said pivot means to form a hinge between said adjacent sections.

2. The articulated vehicle of claim 1 wherein said last named means for maintaining the rollers in continuous bearing contact with the convex end portion includes continuously loaded hydraulic rams operatively connected between said adjacent sections.

3. The articulated vehicle of claim 1 wherein the convex curvature of said convex end portion is shaped so that its radius from the said axis which is coaxial with the pivot means is at a minimum at points contacted by the rollers when said adjacent sections are aligned, said radius increasing as the adjacent sections turn relative to each other.

4. The vehicle of claim 1 wherein said plurality of sections comprises two sections.

5. The vehicle of claim 1 wherein said plurality of sections includes three sections all connected by a single pivot means, said three sections comprising a front section, a rear section, and a center section, with the center section being provided with convex end portions at its front and rear, and with said front and rear sections each having a concave body portion into which a corresponding convex portion of said center section is received, and each of said front and rear sections carrying rollers which are maintained in bearing contact with corresponding convex portions of said center section.

6. The vehicle of claim 1 wherein a hydraulic ram means is provided on each side of the vehicle between said adjacent sections so that extension of one ram means and simultaneous retraction of an opposite ram means will produce relative rotation of said adjacent sections to steer the vehicle.

7. An articulated vehicle as claimed in claim 1 having a concave end portion upon the said other adjacent section to match the said convex end portion which is received therein; the two said end portions being spaced apart by the rollers.

8. An articulated vehicle as claimed in claim 1 wherein the convex end portion is so shaped that the distance between the pivot axis and the rollers is increased as the vehicle turns whereby the portion of the vehicle adjacent the hinge is caused to lift so that its weight will apply a self-centering force to the steering.

References Cited

UNITED STATES PATENTS

| 1,917,396 | 7/1933 | Schantz et al. | 180—12 X |
| 2,101,793 | 12/1937 | Field | 280—423 |
| 3,157,239 | 11/1964 | Bernotas | 180—51 |
| 3,191,709 | 6/1965 | Symons | 180—51 |
| 3,305,039 | 2/1967 | Molby | 180—51 |

FOREIGN PATENTS 630,007    10/1961    Canada.

SAMUEL W. ENGLE, *Primary Examiner.*

U.S. Cl. X.R.

180—51, 79.2; 280—97